United States Patent [11] 3,568,865

[72] Inventor Gunter Willmroth
 Porz/Urbach, Germany
[21] Appl. No. 797,199
[22] Filed Feb. 6, 1969
[45] Patented Mar. 9, 1971
[73] Assignee Wilhelm Hermanns KG
 Porz/Urbach, Germany
[32] Priority Nov. 6, 1968
[33] Germany
[31] P 18 07 295.2

[54] METHOD AND APPARATUS FOR EMPTYING CONTAINERS FILLED WITH BULK, LIQUID OR PASTY MATERIAL
 12 Claims, 9 Drawing Figs.
[52] U.S. Cl. .................................................. 214/310,
 214/152, 214/314
[51] Int. Cl. ................................................ B65g 65/40
[50] Field of Search .......................................... 214/310,
 309, 300, 314, 152

[56] References Cited
 UNITED STATES PATENTS
2,726,137 12/1955 Davis............................ 214/152X
3,147,041 9/1964 Howcroft.................... 214/152X
3,260,389 7/1966 Patch ............................ 214/310
3,294,265 12/1966 Roch et al..................... 214/310

Primary Examiner—Gerald M. Forlenza
Assistant Examiner—George F. Abraham
Attorney—Diller, Brown, Ramik & Holt ABSTRACT: There is disclosed a method for emptying containers filled with bulk, liquid or pasty material, wherein the filled container is placed into a pressure vessel, the interior of the container is connected with that of the pressure vessel, and a connection capable of being shut off which extends through the wall of the pressure vessel and permits the flowing off of the material disposed in the container is provided between the container and a site outside of the pressure vessel, whereafter a pressure differential with a pressure drop to the site outside of the pressure vessel is created between said exterior and the interior of the container and the pressure vessel respectively and after opening the flow off connection. Furthermore there are disclosed apparatus for practicing said method. One of said apparatus is characterized by a tiltably mounted pressure vessel capable of being connected to a compressed air line and provided for receiving the container, the interior of said pressure vessel being capable of being connected with that of the container and a flow off line capable of being connected with the lower end of the interior of the tilted container extending through the wall of said pressure vessel. Another of said apparatus is characterized by a tiltably supported pressure vessel in communication with atmosphere and provided for receiving the container, the interior of said pressure vessel capable of being connected with that of the container and a line capable of being connected with the lower end of the interior of the tilted container and provided for discharging the material extending through the wall of said pressure vessel, said line capable of being connected to a vacuum source.

PATENTED MAR 9 1971

Inventor:
GUNTER WILLMROTH

Mason, Porter Diller & Brown

ATTORNEYS

PATENTED MAR 9 1971  3,568,865

Inventor:
GUNTER WILLMROTH

Mason, Porter, Diller & Brown
ATTORNEYS

Inventor:
GUNTER WILLMROTH

Mason, Porter, Diller & Brown
ATTORNEYS

METHOD AND APPARATUS FOR EMPTYING CONTAINERS FILLED WITH BULK, LIQUID OR PASTY MATERIAL

This invention relates to a method for emptying containers filled with bulk, liquid or pasty material as well as to an apparatus for practicing this method, the containers themselves forming an exchangeable part of the apparatus.

The transportation of bulk, liquid and pasty materials which are to be discharged at the destination by means of compressed air or compressed gases or by means of vacuum from their container is effected in so-called pressure vessels the use of which brings about the following essential disadvantages:

Pressure vessels have a high net weight a result of their construction, and this results in a reduction of the working load of the transportation vehicle carrying them. As a result of their shape it generally is not possible to completely utilize the entire freight space cross section so that too little freight space is available especially for lightweight material to be transported. Pressure vessels furthermore are subject to a current supervision by technical supervision authorities, this resulting in current expenses. The manufacturing costs of a pressure vessel are uncomparatively high in relation to a vessel not subject to pressure. The most essential disadvantage of the prior art pressure vessels is, however, that that they are not suited for mixed cargo transportation; as return freight merely similar bulk, liquid or pasty materials can be taken along in the pressure vessel as in the case of the second transport, there is the danger of a contamination of the material, however, if the containers are not very well cleaned prior to the return transport.

The invention has an an object to eliminate these disadvantages. This is accomplished in that the bulk, liquid or pasty materials to be transported are filled into specifically constructed containers which are not subject to the regulations of the technical supervision authorities for pressure vessels, the filled containers are placed into a pressure vessel at the destination, the interior of the pressure vessel is connected with that of the container and a connection capable of being shut off which extends through the wall of the pressure vessel and permits the flowing off of the material disposed in the container is provided between the container and a site outside of the pressure vessel, whereafter a pressure differential with a pressure drop to the site outside of the pressure vessel is created between said exterior and the interior of the container and the pressure vessel, respectively. The interior of the pressure vessel can either be supplied with compressed air and the emptying of the container can be effected into free atmosphere, or a vacuum can be created in front of the discharge opening of the container, whereas the interior of the pressure vessel is in communication with free atmosphere.

The invention has as a further object that the pressure vessel can be brought into a tilted position during the exertion of the pressure differential in which the inlet opening of the flowoff line provided in the container forms the lowest point of the interior of the container so that in case bulk material is contained in the container this material can be additionally loosened up during the exertion of the differential pressure.

For practicing this method the invention has as a further object for the case that the emptying of the container is effected with compressed air to provide an apparatus comprising a tiltably mounted pressure vessel capable of being connected with a compressed air line and adapted to receive the container, the interior of which pressure vessel is capable of being connected with that of the container and through the wall of which pressure vessel a flowoff line connectable with the lower end of the interior of the tilted container for the material extends, whereas for the case that the emptying of the container is effected under the influence of a vacuum a tiltably mounted pressure vessel is provided in communication with atmosphere and adapted to receive the container, the interior of which pressure vessel is capable of being connected which that of the container and through the wall of which pressure vessel a line extends capable of being connected with the lower end of the interior of the tilted container and adapted for passing off the material, said line being connectable to a vacuum source.

According to the invention the pressure vessel is preferably associated with a wagon which is capable of being placed into the pressure vessel after the opening thereof together with a container placed thereon. The pressure vessel may comprise two parts axially shiftable relative to one another, and the wagon adapted to carry the container can be mounted rollably on the bottoms of the pressure vessel parts. A slide or some other device carrying the container can also be used instead of a wagon.

As already alluded to thereinbefore, the container itself forms an exchangeable part of the emptying apparatus. For according to the invention the container, next to the conventional hermetically closable doors which make the container suitable for receiving mixed cargo, preferably is provided with at least one upper closable filling opening for for the bulk material or the like and with a lower likewise closable discharging opening. Preferably the filling opening as well as the discharging opening are arranged in recesses in the container wall.

For the transportation of liquids or pasty material, a bag of rubber, plastic or the like having pliable walls can be disposed in the container, which is compressed under the effect of the overpressure exerted thereon, so that its contents is discharged via the discharge opening of the container.

Further features of an apparatus according to the invention are illustrated diagrammatically in the drawings which in several examples represent an emptying apparatus with a container according to the invention. In the drawings.

Figure 1:
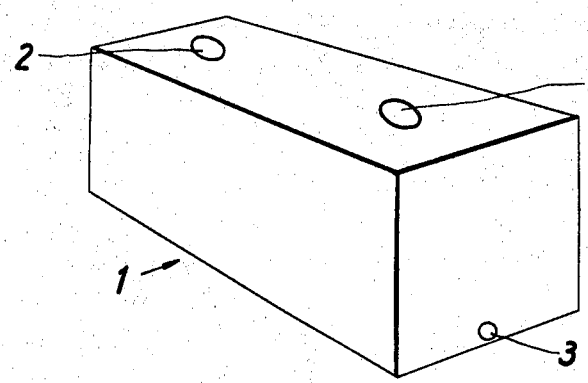
FIG. 1 is a perspective view of a container including features of the invention and suited for receiving mixed cargo, bulk, liquid and pasty material.

The container 1 illustrated in FIG. 1 which has the conventional rectangular form of transportation containers and which may for instance be provided with not illustrated doors at its rear face which are capable of being hermetically sealed, has two closable filling openings 2 at its top side for bulk, liquid or pasty material, and it furthermore is provided with a discharge opening 3 for the material in the container in the vicinity of the lower edge of its face opposite to said doors. The openings 2 and 3 are provided with closures which are preferably arranged recessed in the container walls so that they do not interfere with the stacking of containers next to and on top of each other.

Figure 2:
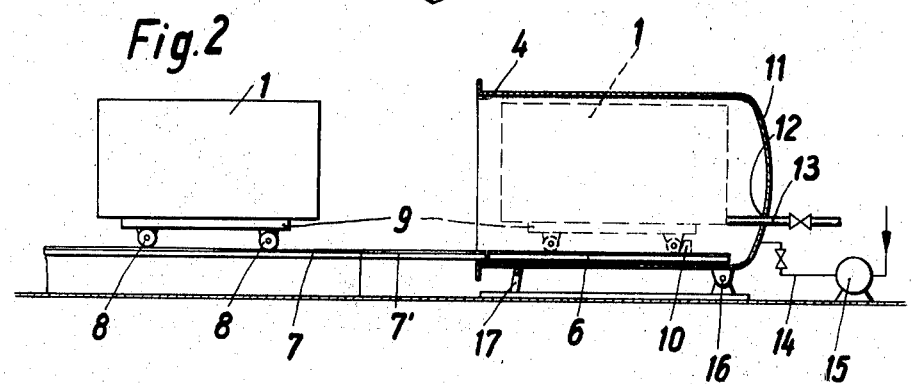
FIG. 2 is the simplest embodiment of an emptying apparatus in a side view including features of the invention.
Figure 3:
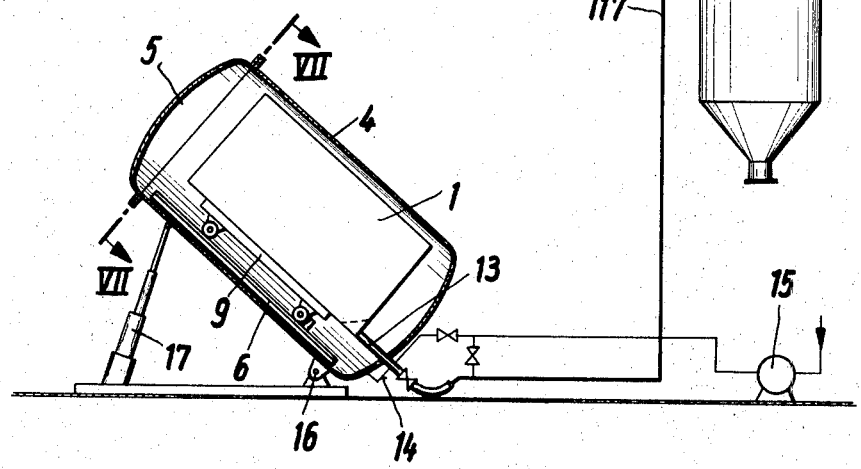
FIG. 3 is a side view similar to that of FIG. 2 of the apparatus wherein the pressure vessel is in the position in which the emptying of the container filled with bulk material or the like is effected.

For emptying the container 1 illustrated in FIG. 1 a pressure vessel 4 (FIG. 2) is provided which has a detachable face wall 5 (FIG. 3). Two rails 6 (FIG. 7) are secured to the bottom of the pressure vessel 4 which form the continuation of a railtrack 7 located outside of the pressure vessel. A wagon 9 having wheels 8 is capable of being moved in longitudinal direction of the track 7. The container 1 is placed on the wagon 9 by means of a not illustrated hoist and is driven into the pressure vessel 4 until it reaches an abutment 10. Subsequently the portion 7ʹʹ of the track 7 is tilted away upwardly, and the face wall 5 is hermetically secured to the pressure vessel body 4.

An opening 12 is provided in the face wall 11 of the pressure vessel 4 which is axially aligned with the discharge opening 3 of the container. A tube 13 is introduced through the opening 12 which carries a bayonet closure at the end directed to the container, which closure coacts with the closure of the discharge opening 3 and which not only provides for a firm connection of the tube 13 with the opening 3 of the container when rotating the tube 13 around its axis, but also at the same time opens the closure so that the material in the container can flow out through the tube 13. The tube 13 is sealed relative to the face wall 11.

The pressure vessel 4 is connected with the compressed air line 14 of a compressor 15, and the upper filling openings 2 of the container 1 are opened for emptying the container. Furthermore the pressure vessel 4 is mounted tiltable at 16 and my may be tilted into the position illustrated in FIG. 3 for instance by a hydraulic lifting device 17. If compressed air is supplied to the pressure vessel 4 in this position, this compressed air also flows into the interior of the container via the opening 2 and presses the material in the container out through the discharge opening 3 and through the line 13, until the container is completely emptied. It should be noted in this connection that there is the same pressure in the interior of the container as well as in the interior of the pressure vessel, so that the container walls are not stressed by pressure when emptying the container with compressed air. The container therefore need not be a pressure vessel and is not subjected to the legal regulations of any technical supervision authorities; it is therefore not only economical in its manufacture, but also in its use. The material discharged from the container is passed on to a storage bin 118 for instance via a line 117.

Figure 4:
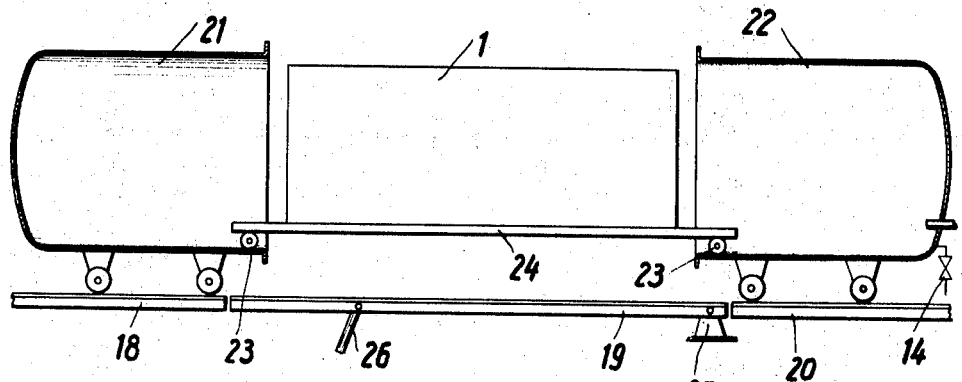
FIG. 4 is a further embodiment of an emptying apparatus including features of the invention in a side view during the placing of the container into the pressure vessel.
Figure 5:
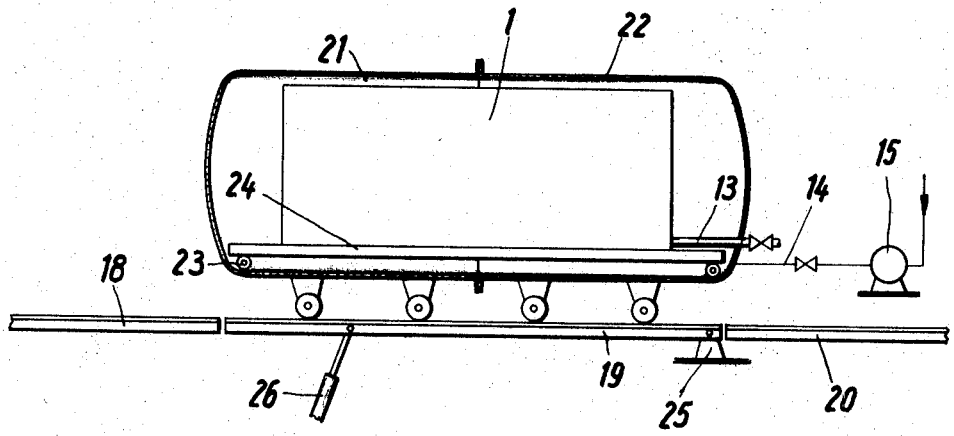
FIG. 5 is a side view similar to FIG. 4 illustrating the pressure vessel in its closed position.
Figure 6:
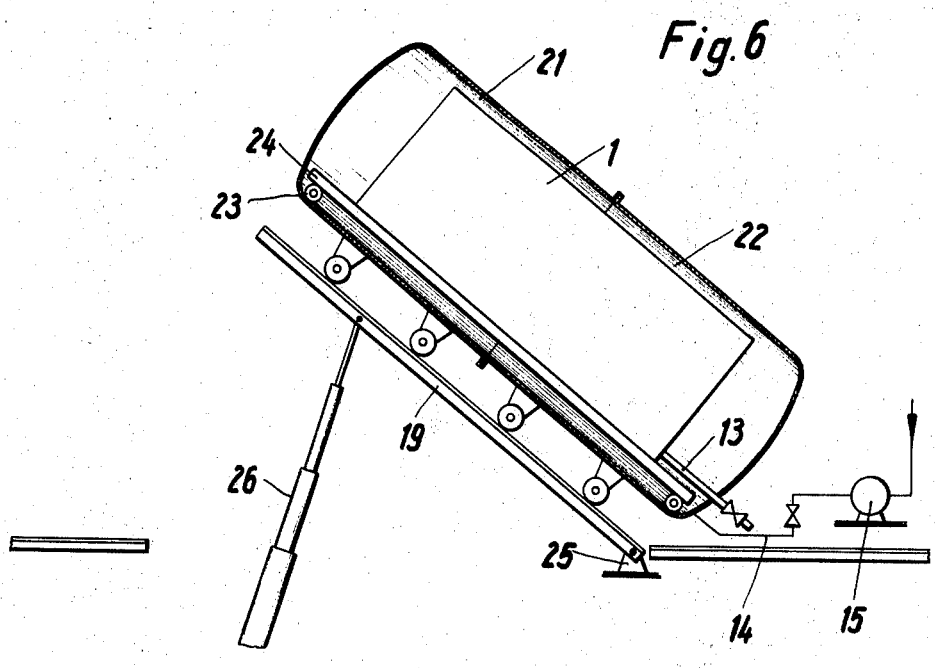
FIG. 6 is the emptying apparatus illustrated in FIG. 5 in the position in which the emptying of the container is effected.

In the embodiment illustrated in FIG. 4 the pressure vessel comprises two halves 21 and 22 movable on rails 18, 19, 20. The halves 21 and 22 can be driven apart in axial direction as illustrated in FIG. 4. On wheels 23 a wagon 24 is supported in the two pressure vessel halves 21 and 22, on which wagon a container 4 may be placed by means of a hoist when the pressure vessel halves have been moved apart. Subsequently the pressure vessel halves 21 and 22 are moved together as illustrated in FIG. 5 and are hermetically secured to one another. The part 19 of the rail track 18, 19, 20 is mounted tiltable at 25 and may be tilted into the position illustrated in FIG. 6 for instance by a hydraulically driven tilting device 26, in which position the container is emptied in the same manner as has been described in connection with FIG. 3.

Figure 7:
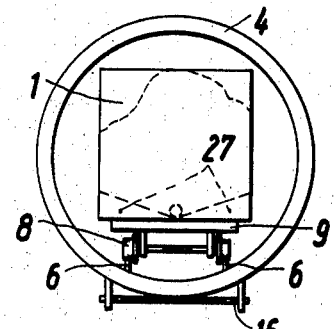
FIGS. 7, 8 and 9 are cross sections through a pressure vessel including features of the invention with containers positioned therein.

FIG. 7 illustrates a cross section through an emptying apparatus including features of the invention with a container filled with bulk material positioned therein. To insure that none of the bulk material stays in the corners of the container adjacent to the outlet 3 in the tilted position of the pressure vessel, baffle plates 27 are provided in these corners which insure a complete flowing out of the bulk material through the discharge opening 3.

Figure 8:
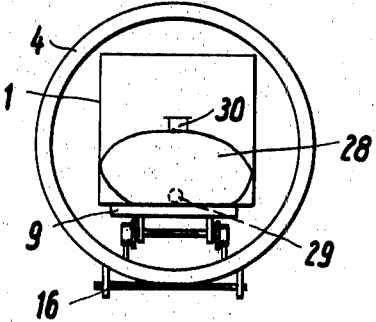

For the transportation of liquids or pasty materials a bag 28 having pliable walls can be disposed in the container as illustrated in FIG. 8 which extends into the discharge opening 3 of the container with an outlet socket 29 and is provided with a closable filling opening 30. If compressed air is fed into the pressure vessel 4 and thus into the container 1, this air presses the bag 28 together which is made for instance of rubber or of a suitable plastic, so that the liquid or pasty material in this bag is conveyed out via the socket 29 and the outlet line 14 (FIG. 2).

Figure 9:
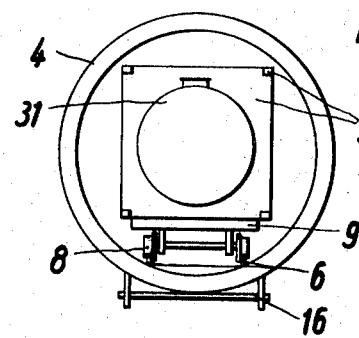

When containers 31 round in cross section (FIG. 9) are used for the transportation of the material, they are mounted in a framework 32 and are placed into the pressure vessel 4 together therewith.

The emptying apparatus cannot only be operated with compressed air or with some other suitable pressurized gas, but also with a vacuum. In this case the vacuum is applied to the discharge line 13 (FIG. 2), whereas the pressure vessel 4 is in communication with atmosphere.

When operating the emptying apparatus with compressed air, it can be advantageous to provide loosening elements capable of being supplied with compressed air in the container in the vicinity of the bottom thereof. Such loosening elements may for instance be hoses with air-permeable walls, air-permeable fabrics, jets or the like via the apertures or pores of which compressed air may be blown into a bulk material to be transported having inferior flow properties so that this material is loosened and satisfactorily flows along the bottom of the container already even in case the container has a relatively low inclination.

I claim:

1. The combination of a container filled with material and apparatus for emptying said container comprising a tiltably mounted sealable pressure vessel capable of being connected to a compressed air line and receiving the filled container means including a portion of said container for connecting the atmosphere of the interior of said pressure vessel with that of the container, and a flowoff line extending from the interior of said container through a wall of said pressure vessel at the end thereof disposed lowermost when tilted.

2. The combination of a container filled with material and apparatus for emptying said container comprising a tiltably mounted sealable pressure vessel in communication with atmosphere and receiving the filled container means including a portion of the container for connecting the atmosphere of the interior of said pressure vessel with that of said container and a line extending through a wall of said pressure vessel and being connected with the interior of said container at the lowermost portion thereof when said container is tilted to pass off material from within the container, said line having means for connecting said line to a vacuum source.

3. The combination defined in claim 1, together with a vehicle associated with the pressure vessel and adapted to be moved therein after the opening thereof together with a container to be emptied seated thereon.

4. The combination defined in claim 3, wherein the pressure vessel comprises two parts axially shiftable relative to one another, and said wagon being mounted for rolling movement on the bottoms of the pressure vessel parts.

5. The combination defined in claim 1, wherein the container is a special container having loosening means therein adapted to be fed with the compressed air, said loosening means being disposed in the container in the vicinity of its bottom.

6. The combination defined in claim 1 wherein said container is provided with at least one upper closable filling opening and at least one lower closable discharge opening, and hermetically sealable closures are provided for said filling opening and said discharge opening.

7. The combination defined in claim 6, wherein said closures are positioned recessed in the walls of said container.

8. The combination defined in claim 6 together with a bag having pliable walls which is disposed in said container for receiving liquid and pasty materials.

9. The combination defined in claim 6, wherein baffle plates are provided in the corners of said container adjacent to said discharge opening by which the material is directed to the discharge opening.

10. A method for emptying containers filled with flowable material such as bulk, liquid or pasty material, comprising the steps of placing the filled container into a sealable pressure vessel, opening a portion of the container for providing a flow passage connecting the interior of the container with the atmosphere of the interior of the pressure vessel, connecting a discharge opening of the container with a discharge tube means which extends through the interior to the exterior of the pressure vessel; and thereafter creating a differential pressure, the lowest pressure being at the exterior of the pressure vessel, between the exterior of the pressure vessel and the interiors of the container and the pressure vessel.

11. A method as defined in claim 10 including the step of bringing the pressure vessel into an inclined position during application of said differential pressure for disposing said discharge opening so that it forms the lowermost point of the interior of the container.

12. A method as defined in claim 10 including the step of loosening the flowable material in the container during the application of said differential pressure.